(12) United States Patent
Lomax et al.

(10) Patent No.: US 8,080,207 B2
(45) Date of Patent: Dec. 20, 2011

(54) COIL PIPING SYSTEM FOR REACTOR VESSEL

(75) Inventors: Franklin D. Lomax, Falls Church, VA (US); Christopher H. Van Dyke, Washington, DC (US); Edward T. McCullough, Dallas, TX (US)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 636 days.

(21) Appl. No.: 12/176,956

(22) Filed: Jul. 21, 2008

(65) Prior Publication Data
US 2009/0223863 A1     Sep. 10, 2009

Related U.S. Application Data

(60) Provisional application No. 60/951,095, filed on Jul. 20, 2007.

(51) Int. Cl.
*B01J 19/00* (2006.01)
*B01J 8/00* (2006.01)
(52) U.S. Cl. ........ 422/129; 422/202; 422/203; 422/220; 422/221
(58) Field of Classification Search .................. 422/129, 422/202, 203, 220, 221
See application file for complete search history.

(56) References Cited

U.S. PATENT DOCUMENTS

| 1,968,940 | A | | 8/1934 | Gross |
| 2,248,993 | A | * | 7/1941 | Houdry .......................... 422/200 |
| 3,490,878 | A | * | 1/1970 | Russell .......................... 422/199 |
| 4,488,865 | A | | 12/1984 | Davis |
| 6,089,859 | A | | 7/2000 | Greiner et al. |
| 6,564,755 | B1 | | 5/2003 | Whelan |
| 6,746,650 | B1 | * | 6/2004 | Lesieur .......................... 422/211 |
| 2005/0161205 | A1 | | 7/2005 | Ashe et al. |

FOREIGN PATENT DOCUMENTS

DE           3929413 A1 *  3/1991

* cited by examiner

*Primary Examiner* — Jennifer A Leung
(74) *Attorney, Agent, or Firm* — Elwood L. Haynes (57) ABSTRACT

A reactor vessel system includes a reactor vessel including a first port in fluid communication with an interior of the reactor vessel and an outlet port connected in fluid communication with the interior of the reactor vessel. A base supports the reactor vessel. A first coil of tubing is connected in fluid communication with the first port and disposed around a perimeter of the reactor vessel. A method of operating a reactor vessel system includes providing a reactor vessel including a first port in fluid communication with an interior of the reactor vessel and an outlet port connected in fluid communication with the interior of the reactor vessel, providing a first coil of tubing connected in fluid communication with the first port and disposed around a perimeter of the reactor vessel, and flowing steam through the first coil and into the reactor vessel.

7 Claims, 6 Drawing Sheets

COIL PIPING SYSTEM FOR REACTOR VESSEL

CROSS-REFERENCE TO RELATED APPLICATIONS

The present application claims priority to U.S. Provisional Patent Application Ser. No. 60/951,095 filed Jul. 20, 2007, the contents of which are incorporated herein by reference.

BACKGROUND OF THE INVENTION

Field of the Invention

A reactor vessel that operates at elevated temperatures can expand (e.g., elongate in length along an axial length of the vessel) as the reactor vessel heats from a non-operational, cool state to an operational, heated state. Such reactor vessels are typically mounted by mounting the base thereof at a fixed location, and can be interconnected by piping connections to one or more other components. However, the other components may operate under different thermal conditions and/or be subject to different expansion/contraction configurations than the reactor vessel. The inventions have determined that such relative positional shifts between components in such a system can create stresses in the piping connections, which can cause failure or hasten fatigue failure in the piping connections.

BRIEF SUMMARY OF THE INVENTION

In an effort to eliminate the above problems, the inventors have constructed a coil piping system as described below.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

Embodiments of the present invention are described hereinafter with reference to the accompanying drawings. In the following description, the constituent elements having substantially the same function and arrangement are denoted by the same reference numerals, and repetitive descriptions will be made only when necessary.

A reactor vessel that operates at elevated temperatures can expand (e.g., elongate in length along an axial length of the vessel) as the reactor vessel heats from a non-operational, cool state to an operational, heated state. Such reactor vessels are typically mounted by mounting the base thereof at a fixed location, and can be interconnected by piping connections (e.g., inlet piping, outlet piping, etc.) to one or more other components (e.g., another reactor vessel, a preheater assembly, etc.). However, the other component(s) may operate until different thermal conditions and/or be subject to different expansion/contraction configurations than the reactor vessel. Thus, the expansion of the vessel during operating conditions may shift the position of one or more ports thereof (e.g., inlet port, outlet port, etc.) with respect to the base, and the positional shift of the port(s) of the reactor vessel may not correspond to positional shifts in the ports of the other component (s) to which the piping connection(s) is mounted. Thus, the relative positional shifts in the port(s) of the reactor vessel and the port(s) of the other component(s) to which the reactor vessel is interconnected by the piping connection(s), can create stresses in the piping connection(s), which can cause failure or hasten fatigue failure in the piping connection or port(s). Also, if one or more ports of the reactor vessel is connected via connection piping to port(s) of one or more other components that do not shift in position (i.e. do not expand or contract) and thus remain in a fixed position, then the positional shift of the port(s) of the reactor vessel will create stresses in the piping connection(s), which can cause failure or hasten fatigue failure in the piping connection or port(s) or support structure(s).

The present invention provides a method and system for providing piping connections for a reactor vessel that can alleviate negative consequences resulting from such stresses. The piping system preferably provides one or more piping connections to a vessel that allows for minimization or elimination of stresses in the piping connections during operation of the vessel.

Figure 5A:
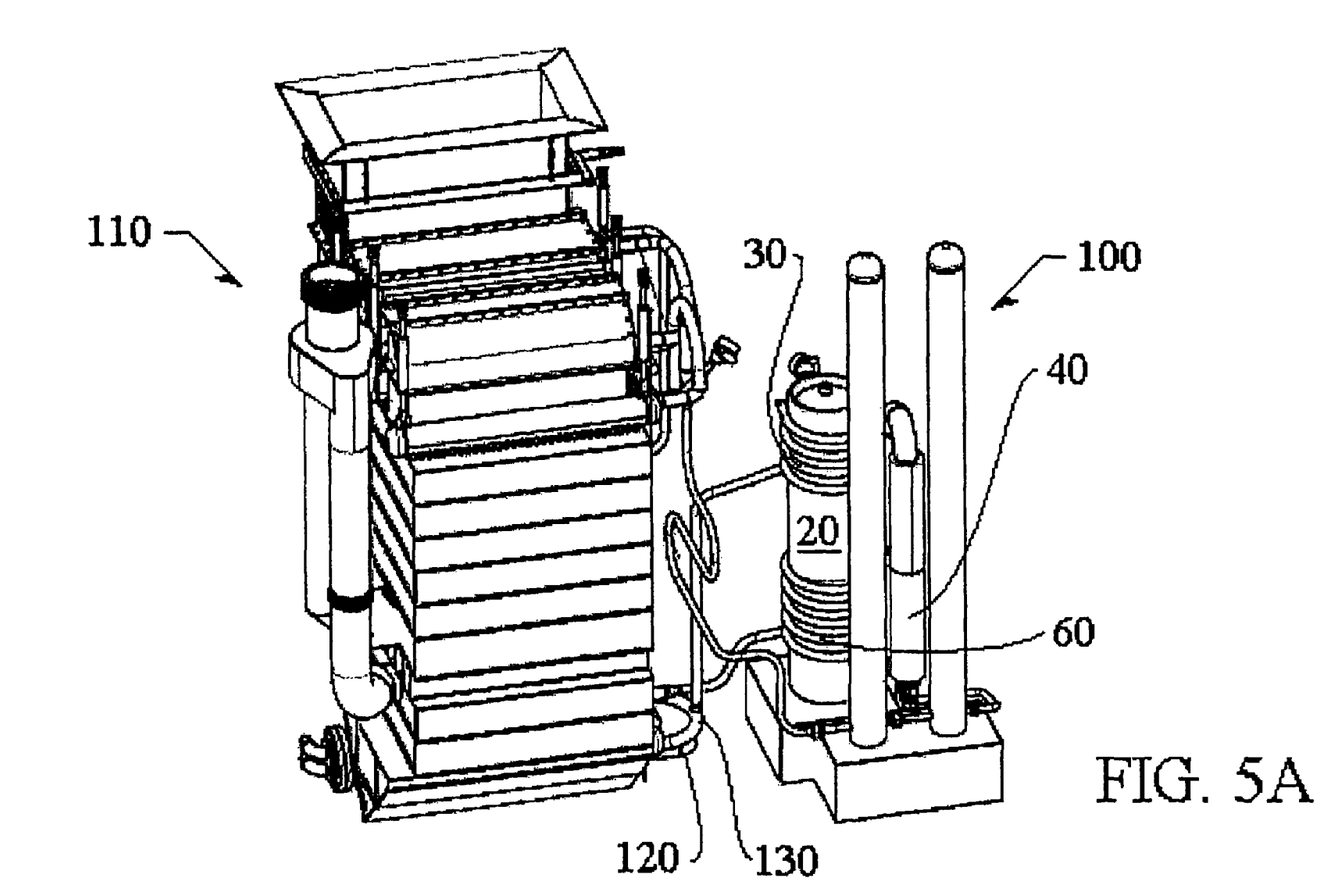
FIGS. 5A and 5B are perspective views of a reactor system showing the coil piping system of the present invention connected to a water gas shift reactor vessel with a natural gas preheater, a hydrogen desulfurizer vessel, and a steam reformer reactor vessel having an air-preheater.
Figure 5B:
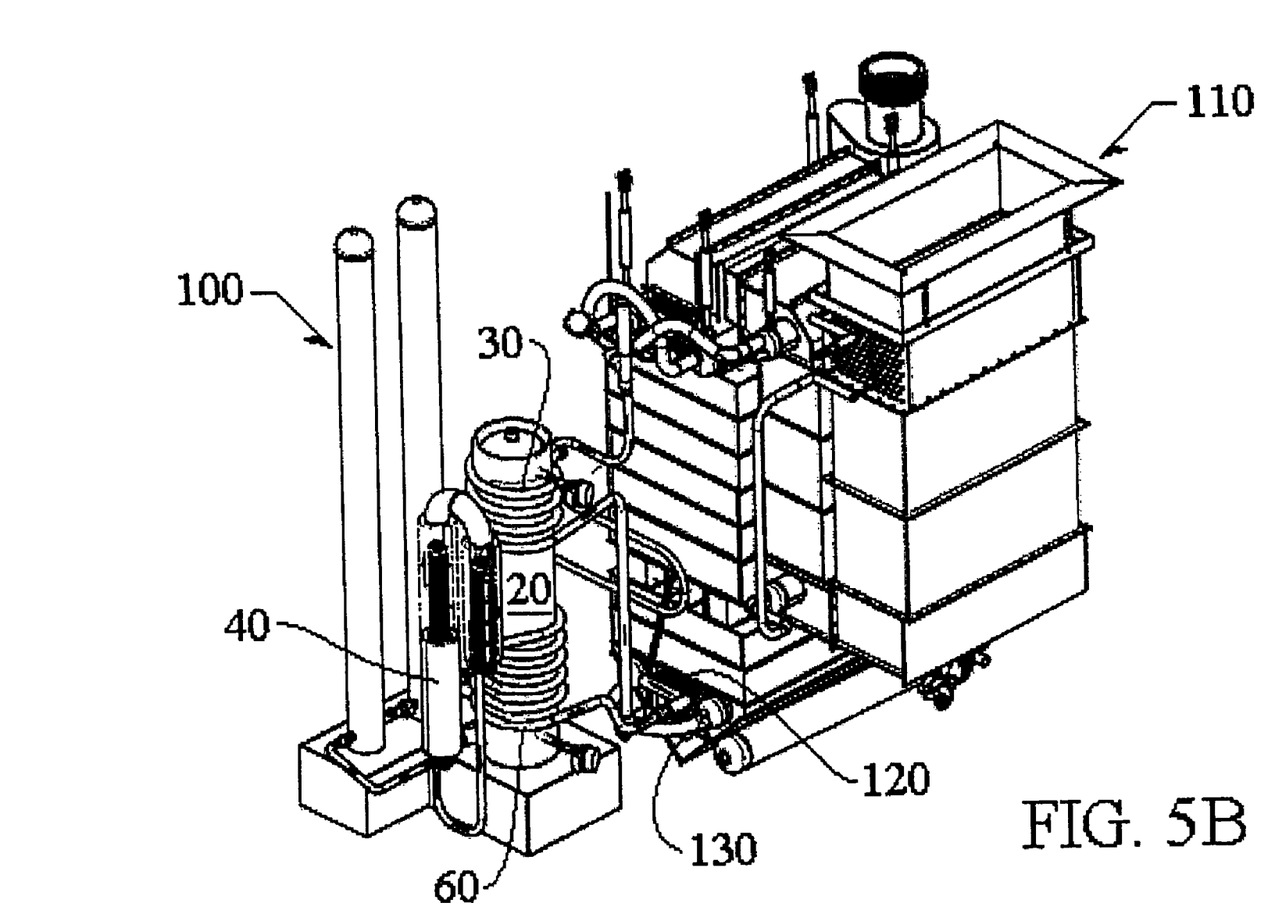

FIGS. 1A-1B and 2A-2C depict an embodiment of a coil piping system according to the present invention. The coil piping system 10 depicted includes an inlet coil 30 and an outlet coil 60; however, note that the system can alternatively include only one of the inlet coil 30 or the outlet coil 60 (i.e., the system need not include both), or can alternatively include coils in addition to the inlet coil and the outlet coil, for example, for connection to other ports (not shown) in the vessel. The coil piping system 10 depicted in FIGS. 1A-1B and 2A-2C is connected to a water-gas shift reactor (WGS) vessel 20; however, the invention can be applied to any other type of vessel or housing subject to expansion and contraction during the lifetime thereof. FIGS. 5A and 5B are perspective views of an exemplary reactor system incorporating the coil piping system of the present invention connected to the WGS vessel 20 with a natural gas preheater 40, a hydrogen desulfurizer (HDS) vessel 100, a steam reformer reactor vessel 110, and an air-preheater 120 for the steam reformer reactor 110.

The WGS vessel 20 includes a lower potion 22 rigidly mounted to a base 12, which is rigidly affixed to a floor or to a packaging unit or housing, for example. The WGS vessel 20 has an inlet port 28 on a side of an upper portion 26 thereof and an outlet port 24 on a side of the lower portion 22. Within the WGS vessel 20 is a packed bed of catalyst material, such as a low-temperature water-gas shift catalyst. Thus, fluid (in this case, reformate from a steam reformer reactor vessel) enters the upper portion 26 of the WGS vessel 20 through the inlet port 28, then travels downward through the packed bed of catalyst material, and then exits the lower portion 22 of the WGS vessel 20 through the outlet port 24.

The WGS vessel 20 depicted in FIGS. 1A-1B and 2A-2C is connected to a natural gas preheater assembly (or NG preheater) 40; however, the invention can be applied to any vessel or housing, and need not be connected to such a preheater, or can be connected to any other type of component. A conduit 25 is attached to the side of the lower portion 22 of the WGS vessel at the outlet port 24. The conduit 25 provides a fluid interconnection between the outlet port 24 and an inlet 42 of the NG preheater 40. The conduit 25 also provides a structural interconnection between the WGS vessel 20 and the NG preheater 40 by providing a cantilevered support of the NG preheater 40.

In this embodiment, the NG preheater 40 uses reformate exiting the WGS vessel 20 to preheat a natural gas feed before the natural gas feed is sent to and used in a hydrogen desulfurizer (HDS) vessel 100 (see FIGS. 5A and 5B). The NG preheater 40 is used, for example, to increase the temperature of the natural gas feed to an appropriate level to ensure that the desulfurization reaction takes place in the HDS vessel 100. In addition to the depictions of the NG preheater in FIGS. 1A, 1B, 2A, and 2C, FIGS. 3A-3D depict the details of the internal and external structures of the NG preheater.

The NG preheater 40 includes two shell-and-tube heat exchangers; a first shell-and-tube heat exchanger provided within section 44 and a second shell-and-tube heat exchanger provided within section 48. The reformate exiting the WGS vessel 20 is provided shell-side as it travels through the NG preheater 40, while the natural gas feed is provided tube-side as it travels through the NG preheater 40.

The reformate exiting the WGS vessel 20 through outlet port 24 travels through conduit 25 and enters the inlet 42 of the NG preheater 40. The reformate then travels shell-side upward through the first shell-and-tube heat exchanger provided within section 44, then travels through curved section 46 (which does not include a tube array for the natural gas, as will be explained below), then travels shell-side downward through the second shell-and-tube heat exchanger provided within section 48, and then exits the NG preheater 40 through an outlet port 50.

The natural gas feed enters the NG preheater 40 through an inlet 52, then travels upward tube-side through a tube array of the second shell-and-tube heat exchanger to an upper end of the section 48 for a first pass through section 48, then turns and travels downward tube-side through the tube array of the second shell-and-tube heat exchanger for a second pass through section 48, then travels from a lower end of section 48 to a lower end of section 44 via tube 55 (the J-shaped tube), then enters the lower end of section 44 through an inlet 56, then travels upward tube-side through a tube array of the first shell-and-tube heat exchanger to an upper end of the section 44 for a first pass through section 44, then turns and travels downward tube-side through the tube array of the first shell-and-tube heat exchanger for a second pass through section 44, and then exits the NG preheater 40 through outlet 58. The preheater natural gas feed exiting outlet 58 travels via a conduit to the HDS vessel 100 for use therein.

The inlet coil 30 of the present invention has an inlet end 32 that is connected to an outlet port 130 of a steam gas reformer vessel 110 via rigid piping. The inlet coil 30 includes a rigid connection piping portion 34 that generally can include any combination of straight and curved sections of piping needed to connect the inlet end 32 (and the outlet port of the steam gas reformer vessel 110) to an end of a coil portion 36 of the inlet coil 30. The opposite end of the coil portion 36 has an outlet end 38 connected to the inlet port 28 of the WGS vessel 20.

The outlet coil 60 of the present invention has an inlet end 62 that is connected to the outlet port 50 of the NG preheater 40 for receiving the reformate exiting the NG preheater 40. The inlet end 62 of the outlet coil 60 is connected to an end of a coil portion 64. The opposite end of the coil portion 64 is connected to a rigid piping connection portion 66 having an outlet 68. The rigid connection piping portion 66 generally can include any combination of straight and curved sections of rigid piping needed to connect the outlet 68 to another component, which in this case is a preheater 120 used to preheat air before the air is used in the steam gas reformer vessel 110.

The coil portion 36 of the inlet coil 30 is made of tubing or piping that is bent to form a helical coil. In the embodiment depicted, the coil portion 36 of the inlet coil 30 wraps around the WGS vessel 20 about four times; however, the coil portion 36 of the inlet coil 30 can alternatively wrap around the WGS vessel 20 more times or less times than in the embodiment depicted. The coil portion 36 forms a coil spring.

The coil portion 64 of the outlet coil 60 is made of tubing or piping that is bent to form a helical coil. In the embodiment depicted, the coil portion 64 of the outlet coil 60 wraps around the WGS vessel 20 five times; however, the coil portion 64 of the outlet coil 60 can alternatively wrap around the WGS vessel 20 more times or less times than in the embodiment depicted. The coil portion 64 forms a coil spring.

Figure 1A:
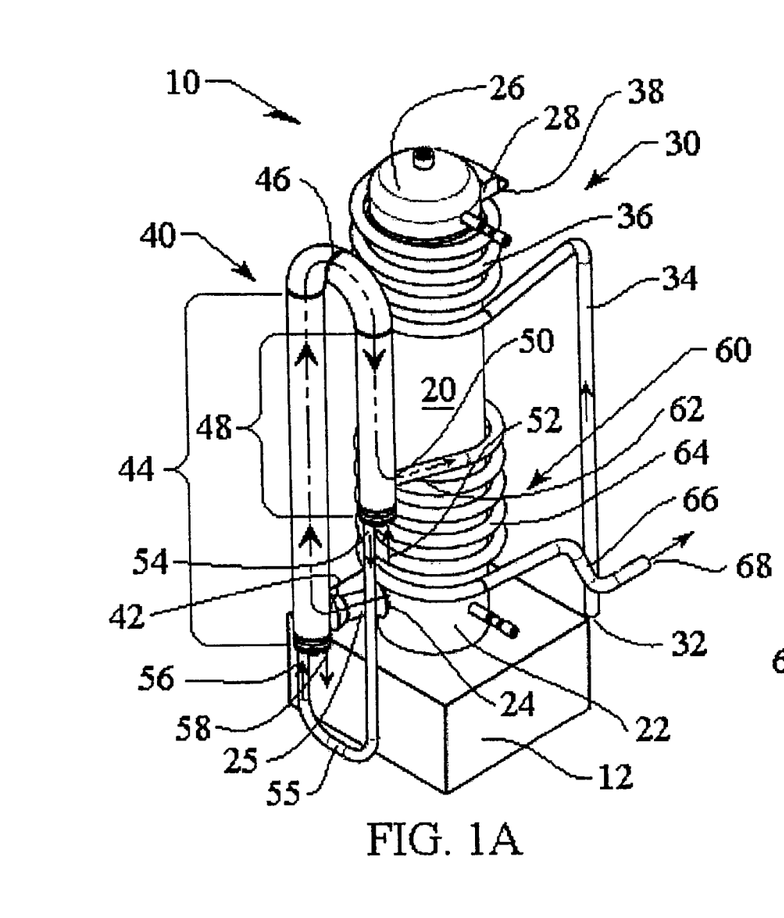
FIG. 1A is a front perspective view of a coil piping system for a water gas shift reactor according to the present invention.
Figure 1B:
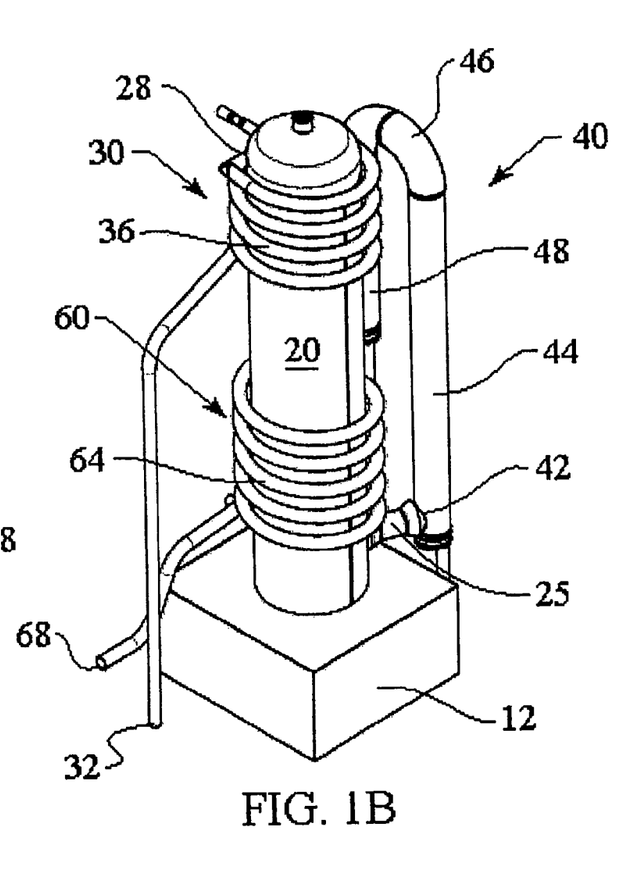
FIG. 1B is a rear perspective view of the coil piping system for a water gas shift reactor according to the present invention.
Figure 2A:
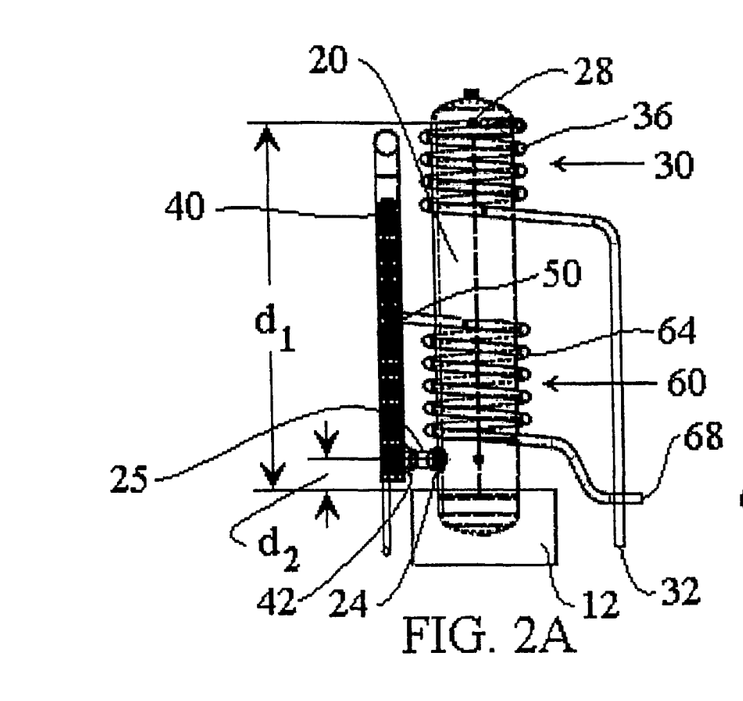
FIG. 2A is a front elevational view of the coil piping system for a water gas shift reactor according to the present invention.
Figure 2B:
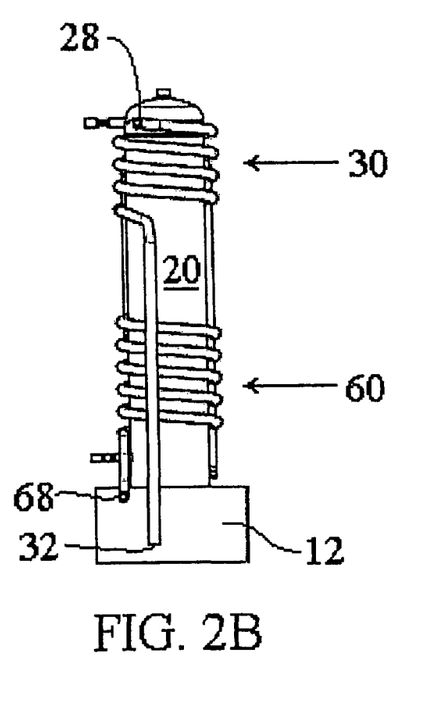
FIG. 2B is a side elevational view of the coil piping system for a water gas shift reactor according to the present invention.
Figure 2C:
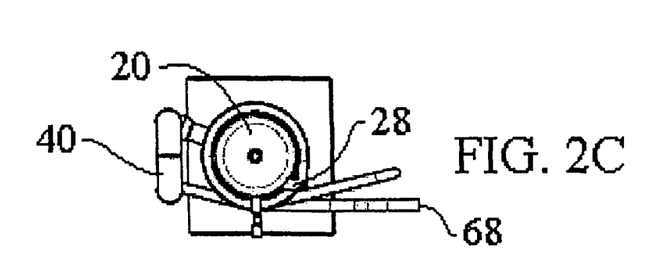
FIG. 2C is a top view of the coil piping system for a water gas shift reactor according to the present invention.
Figures 3A, 3B, 3C, 3D:
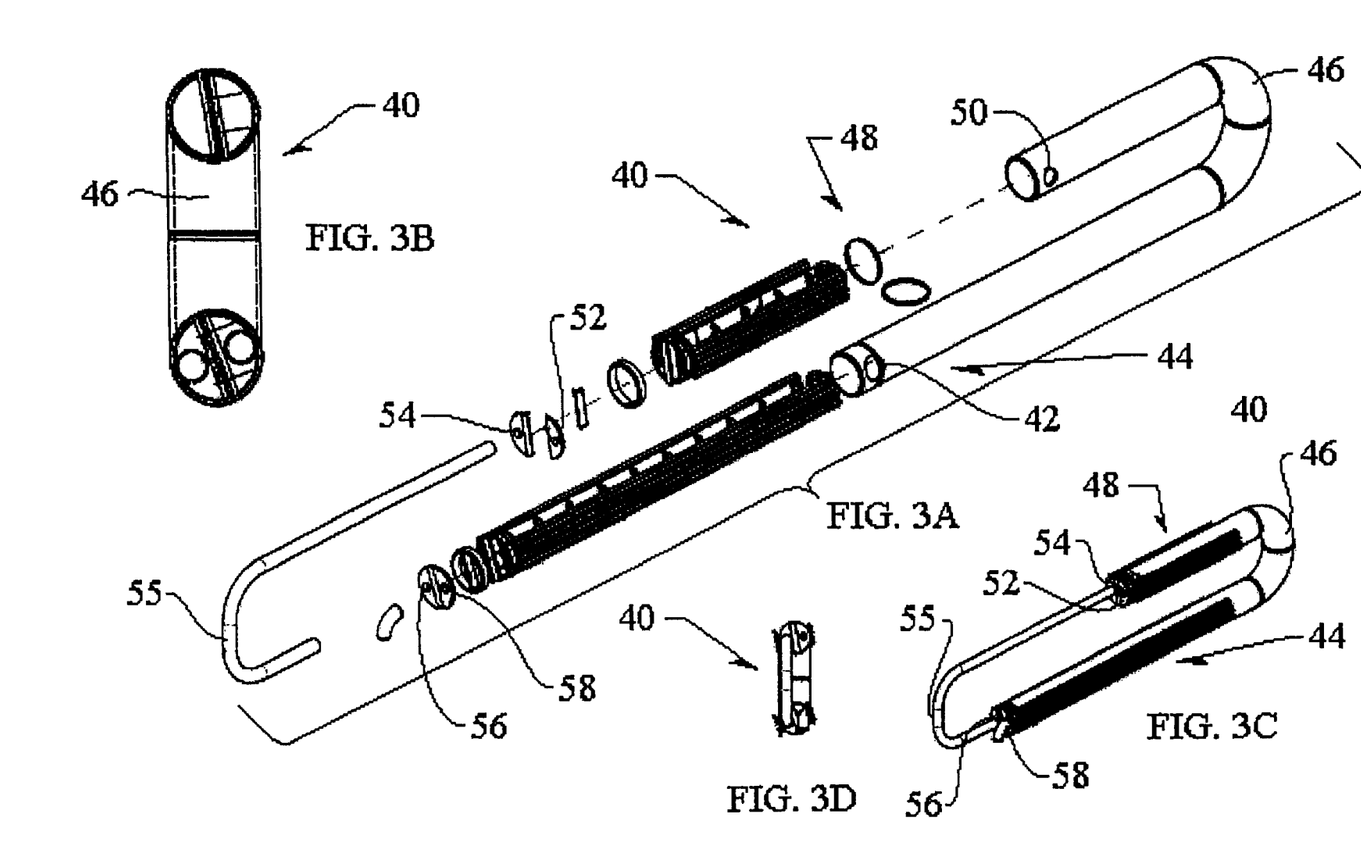
FIG. 3A is an exploded, perspective view of the natural gas preheater depicted in FIGS. 1A-1B and 2A-2C.
FIG. 3B is an assembled, cross-sectional view of the natural gas preheater depicted in FIGS. 1A-1B and 2A-2C.
FIG. 3C is a reduced, assembled, perspective view of the natural gas preheater depicted in FIGS. 1A-1B and 2A-2C.
FIG. 3D is a reduced, assembled, bottom elevational view of the natural gas preheater depicted in FIGS. 1A-1B and 2A-2C.

As can be seen in FIGS. 2A and 2B, the inlet port 28 of the WGS vessel 20 is providing at an elevation that is a distance $d_1$ away from the upper surface of the base 12, within which the WGS vessel 20 is mounted. Additionally, the outlet port 24 of the WGS vessel 20 is providing at an elevation that is a distance $d_2$ away from the upper surface of the base 12. During operation of the WGS vessel 20, the WGS vessel 20 will become heated, which will cause thermal expansion of the WGS vessel 20 and elongation of the WGS vessel 20 along the axial length thereof. Thus, the distance $d_1$ and the distance $d_2$ will vary from a cold, non-operational state to a hot, operational state, such that $d_{1(OPERATIONAL\ STATE)} > d_{1(NON-OPERATIONAL\ STATE)}$, and $d_{2(OPERATIONAL\ STATE)} > d_{2(NON-OPERATIONAL\ STATE)}$.

In addition to the variation in the positions of the inlet port 28 and the outlet port 24 of the WGS vessel 20, the ports of the components to which the inlet port 28 and the outlet port 24 are connected can also vary in position due to thermal expansion/contraction of those components. The relative positional shifts in the ports 24 and 28 of the WGS vessel 20 and the ports of the other components to which the WGS vessel 20 is interconnected by piping connections, can create stresses in the piping connections, which can cause failure or hasten fatigue failure in the piping connection or ports. Also, if one or more ports of the WGS vessel 20 is connected via connection piping to port(s) of one or more other components that do not shift in position (i.e. do not expand or contract) and thus remain in a fixed position, then the positional shift of the port(s) of the WGS vessel 20 will create stresses in the piping connection(s), which can cause failure or hasten fatigue failure in the piping connection or port(s).

Based on experimentation or calculation, the relative positional shift between the inlet port 28 of the WGS vessel 20 and the outlet port of the component to which it is connected can be determined between a non-operational state and an operational state of the WGS vessel 20 and that component. Once this relative positional shift has been determined, the coil portion 36 of the inlet coil 30 can be configured to absorb the relative positional shift between the inlet port 28 of the WGS vessel 20 and the outlet port of the component to which it is connected.

Similarly, the relative positional shift between the outlet port 24 of the WGS vessel 20 and the inlet port of the component to which it is connected can be determined between a non-operational state and an operational state of the WGS vessel 20 and that component. And, once this relative positional shift has been determined, the coil portion 64 of the outlet coil 60 can be configured to absorb the relative positional shift between the outlet port 24 of the WGS vessel 20 and the inlet port of the component to which it is connected.

In the preferred embodiment of the present invention, the coil portions 36 and 64 are configured such that low or no stress is present in the inlet coil 30 and outlet coil 60 during an operational state of the WGS vessel 20 and the components connected thereto. Thus, the helical springs formed by the coil portions 36 and 64 are in an unstressed, uncompressed state during the operational state of the WGS vessel 20 and the components connected thereto. However, when the WGS vessel 20 and the components connected thereto are in a cold, non-operational state, the thermal contraction of the WGS vessel 20 and the components connected thereto will cause relative positional shifts between the respective inlet and outlet ports, which will axially compress the helical springs formed by the coil portions 36 and 64. Thus, in the cold, non-operational state, the helical springs formed by the coil portions 36 and 64 will be in a compressed state.

Figure 4A:
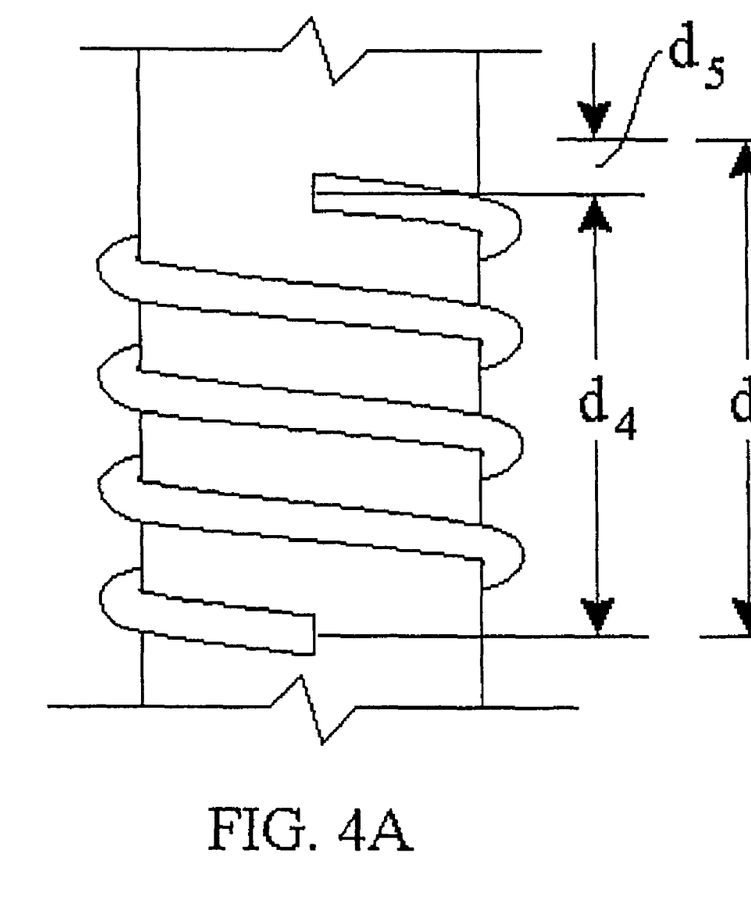
FIGS. 4A and 4B are diagrams depicting a coil in a compressed state and in a non-compressed state, respectively.
Figure 4B:
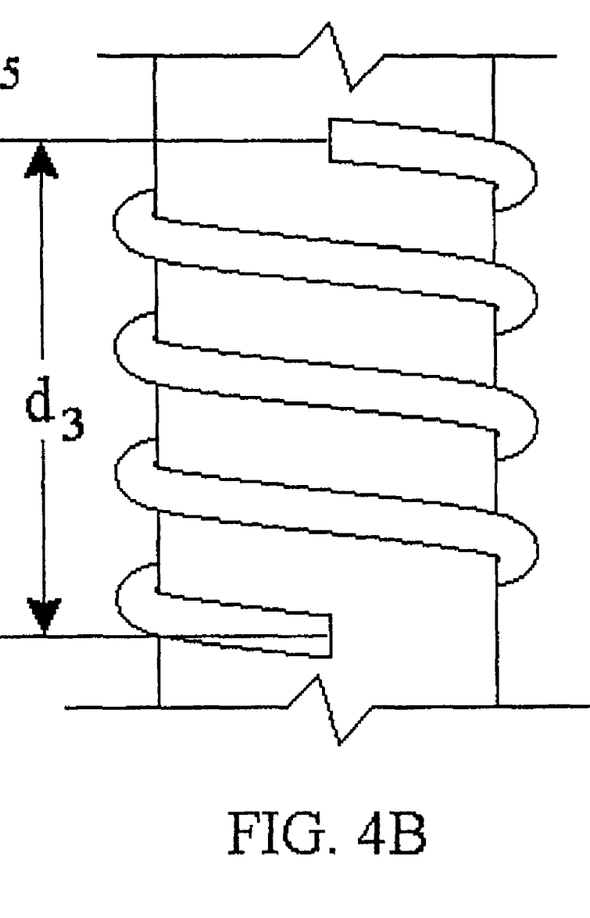

FIGS. 4A and 4B are diagrams depicting a coil in a compressed state and in a non-compressed state, respectively, in order to provide an explanation of how to configure the coil portions 36 and 64 of the present invention. The coil portions can be constructed such that the coil has an axial length $d_3$ when in a non-compressed state as depicted in FIG. 4B, and an axial length $d_4$ when in a compressed state as depicted in FIG. 4A. Once the relative positional shifts are determined for the inlet port 28 and the outlet port 24 and the components to which they are connected, then the positional shift value for the inlet port and the positional shift value for the outlet port 24 can each be used as a distance $d_5$, which is the respective distance by which the coil portions 36 and 64 should be compressed during mounting in the non-operational state. Thus, during the operational state, the relative positional shifts will uncompress the helical springs, such that the piping connections are in an unstressed condition.

Alternatively, the coil portions can be configured such that the helical coils are in a compressed configuration in the operational state, and in a non-compressed configuration during the non-operational state. Further alternatively, the coil portions can be configured such that the helical coils are in tension, rather than compression, when in a stressed state. Alternatively, the coil portions can be configured such that the helical coils are in compression in the operational state, in tension in the non-operational state, and in an unstressed state during a point in time when the system is heating up from the cold, non-operational state to the heated, operational state, and during a point in time when the system is cooling down from the heated, operational state to the cold, non-operational state. Further alternatively, the coil portions can be configured such that the helical coils are in tension in the operational state, in compression in the non-operational state, and in an unstressed state during a point in time when the system is heating up from the cold, non-operational state to the heated, operational state, and during a point in time when the system is cooling down from the heated, operational state to the cold, non-operational state.

Thus, the coil system of the present invention advantageously can be configured to reliably absorb stresses without failure, can be configured to reduce the magnitude of stresses caused by thermal expansion/contraction changes in the overall system, and/or can be configured to provide either a non-stressed operational, state or a non-stressed, non-operational as desired. By taking into account the changes in the relative positions of inlets and outlets of the various components in the system due to thermal expansion/contraction, the coil system of the present invention can provide a robust piping system. If desired, the coil(s) can be manufactured in a prestressed state and maintained in that prestressed state during shipping, such that the piping system would be unstressed under normal operating conditions. For example, if it is determined that a shift in relative position from cold state to hot operating state will be 0.75 inches, the coil can be prestressed with 0.75 inches of axial compression.

In the preferred embodiment, the coils are not attached to the outer walls of the WGS vessel, but rather a minimum spacing is maintained between the outer surface of the WGS vessel and the inner diameter of the coils under both operating and non-operating conditions. Preferably, the spacing provided is large enough to allow for a layer of insulation to be provided around the outer surface of the WGS vessel. Additionally, the coils are preferably insulated and intended to be adiabatic.

The WGS vessel is depicted as including a lifting lug at a top surface thereof, and an upper thermowell and a lower thermowell are depicted as extending from side surfaces thereof for thermocouples used to measure temperatures within the WGS vessel.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

The invention claimed is:

1. A reactor vessel system comprising: a reactor vessel including a first port in fluid communication with an interior of the reactor vessel and an outlet port connected in fluid communication with the interior of the reactor vessel; a base that supports the reactor vessel; and a first coil of tubing connected in fluid communication with the first port and disposed around a perimeter of the reactor vessel, wherein the first coil is configured to be in a first state, which is a compressed state, while the reactor vessel is in an unheated state and configured to be in a second state, which is a state of less compression, while the reactor vessel is in a heated state relative to the unheated state.

2. The reactor vessel system according to claim 1, further comprising a second coil of tubing extending around the perimeter of the vessel and connected in fluid communication with a second port.

3. The reactor vessel system according to claim 2, wherein the reactor vessel extends in a first direction from the base, and a distance between the first port and the base as measured along the first direction is greater than a distance between the second port and the base as measured along the first direction.

4. The reactor vessel system according to claim 2, wherein the first and second ports extend from the reactor vessel in second and third directions perpendicular to the first direction.

5. The reactor vessel system according to claim 1, wherein the reactor vessel includes insulation material disposed on a wall of the reactor vessel.

6. The reactor vessel system according to claim 1, wherein the first coil is insulated.

7. The reactor vessel system according to claim 1, further including a gap disposed between the first coil and the reactor vessel, the gap extending around an entire perimeter of the reactor vessel except for the first port.

* * * * *